Sept. 10, 1968            F. M. POTTER            3,401,290
PERMANENT MAGNET ROTOR ELECTRIC GENERATOR WITH
AXIALLY MOVABLE STATOR FOR ADJUSTING VOLTAGE
Filed May 12, 1966
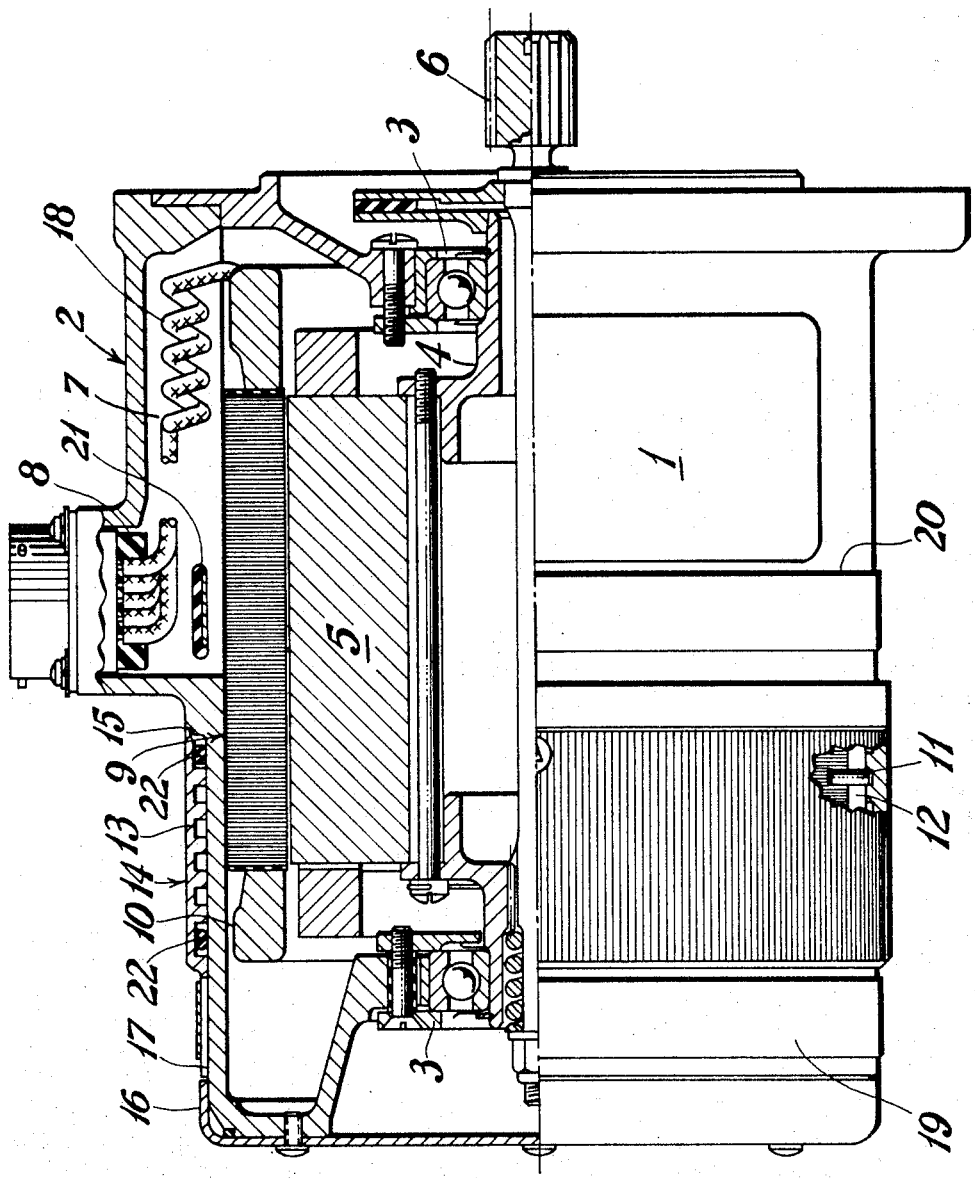
INVENTOR.
FREDERICK M. POTTER
BY
*ATTORNEY*

United States Patent Office 3,401,290
Patented Sept. 10, 1968

3,401,290
PERMANENT MAGNET ROTOR ELECTRIC GENERATOR WITH AXIALLY MOVABLE STATOR FOR ADJUSTING VOLTAGE
Frederick Milton Potter, Little Silver, N.J., assignor to The Bendix Corporation, Eatontown, N.J., a corporation of Delaware
Filed May 12, 1966, Ser. No. 549,579
6 Claims. (Cl. 310—191)

The present invention relates to dynamoelectric machines and more particularly to a permanent magnet generator.

Heretofore one of the disadvantages of permanent magnet generators was the lack of adjustment for output voltage. Once the machine was assembled it was difficult to change the output voltage.

The present invention provides a permanent magnet generator in which the output voltage may be adjusted by means external to the machine with simple tools. The adjustment is accomplished by moving the stator assembly relative to the rotor.

It is an object of the invention to provide an improved dynamoelectric machine.

Another object of the invention is to provide an improved permanent magnet generator.

Another object of the invention is to provide novel means for adjusting the output voltage of a permanent magnet generator.

The above and other objects and features of the invention will appear more fully hereinafter from a consideration of the following description taken in connection with the accompanying drawing wherein one example is illustrated by way of example.

In the drawing:

The single figure is a partial cutaway view of a dynamoelectric machine embodying the invention.

Referring now to the drawing, a dynamoelectric machine is indicated generally by the numeral 1 and has a housing 2. Mounted in the housing 2 by bearings 3 is a shaft 4 upon which is mounted a permanent magnet rotor 5. The shaft 4 has a splined section 6 adapted to mate with a splined section of a driving source (not shown). The housing 2 has a raised channel section 7 which terminates in a terminal block 8.

A stator 9 includes a stator winding 10 and is proportioned to have a slip fit in the housing 2. Pins 11 are located circumferentially in the stator 9 on a thread line axially and extend through openings 12 in the housing 2. The pins 11, for example three stainless steel pins located 120° apart, engage internal threads 13 on a nut 14 that surrounds the housing 2. The nut 14 is positioned on the housing 2 by a shoulder 15 and end cover 16. The nut 14 has a slotted section 17 extending beyond the threads 13.

When the nut 14 is turned, the stator 9 is moved axially in the housing 2 in a direction depending upon the direction in which the nut is turned. Maximum voltage is obtained when the stator 9 and rotor 5 are in alignment. As the stator 9 is moved out of alignment the voltage decreases. Output conductors 18 from the stator winding 10 are coiled in the channel section 7 to provide sufficient flexibility for movement of the stator.

After the stator has been adjusted a clamping strap 19 is tightened to secure the nut 14 in the fixed position. A similar clamping strap 20 surrounds the housing 2 at the approximate center of the magnet length of the machine. The strap 20 is threaded through openings 21 near the bottom of the channel 7. The strap 20 is loosened when it is desired to move the stator 9, and is clamped tight to hold the stator 9 securely after the adjustments have been made.

Sealing rings 22 may be provided as protection for the openings 12 in the housing 2. Also a lubricant may be used between the stator 9 and the housing 2 to facilitate the movement of the stator 9 relative to the housing 2.

Although only one embodiment of the invention has been illustrated and described, various changes in the form and relative arrangement of the parts, which will now appear to those skilled in the art, may be made without departing from the scope of the invention.

What is claimed is:

1. A permanent magnet generator comprising a housing, a stator, a rotor, means mounting said rotor for rotation in said housing, said stator mounted in said housing and having a slip fit therewith, and means including a nut surrounding said housing for moving said stator axially relative to said rotor.

2. The combination as set forth in claim 1 and including clamping means surrounding said housing and said nut.

3. The combination as set forth in claim 1 and including flexible leads from said stator to permit axial movement of said stator.

4. The combination as set forth in claim 1 and including a lubricant between said stator and said housing.

5. The combination as set forth in claim 1 and including pins in said stator extending through openings in said housing and engaging threads in said nut.

6. The combination as set forth in claim 1 and including means for retaining said nut and said housing.

References Cited

UNITED STATES PATENTS

| 3,209,155 | 9/1965 | Struble | 310—191 X |
| 3,242,365 | 3/1966 | Kober | 310—268 |
| 3,330,976 | 7/1967 | Brown | 310—191 |

OTHER REFERENCES

German printed application (Lohest and Weber) 1,048,324, Jan. 8, 1959.

MILTON O. HIRSHFIELD, *Primary Examiner.*

WARREN E. RAY, *Assistant Examiner.*